United States Patent [19]

Bessouat et al.

[11] 4,212,658

[45] Jul. 15, 1980

[54] CONNECTION BETWEEN PARALLEL TUBULAR COMPONENTS OF A CYCLONE SEPARATOR

[75] Inventors: Roger Bessouat, Paris; Gérard Tondeur, Velizy Villacoublay; Patrick Talleu, Chatou; Jean-Pierre Cerdan, Houilles, all of France

[73] Assignees: Stein Industrie, Paris; Electricite de France, Velizy Villacoublay, both of France

[21] Appl. No.: 6,304

[22] Filed: Jan. 24, 1979

[30] Foreign Application Priority Data

Feb. 13, 1978 [FR] France ................................ 78 03983

[51] Int. Cl.$^2$ ................................ B01D 45/16

[52] U.S. Cl. ................................ 55/347; 55/457; 210/232; 210/512 M

[58] Field of Search .............. 210/304, 512 R, 512 M, 210/232; 55/347, 456, 457; 209/144, 211

[56] References Cited

FOREIGN PATENT DOCUMENTS

| | | | |
|---|---|---|---|
| 226194 | 6/1958 | Australia | 210/512 M |
| 1090262 | 3/1955 | France | 210/512 M |
| 877257 | 9/1961 | United Kingdom . | |
| 1014934 | 12/1965 | United Kingdom | 210/512 M |

*Primary Examiner*—Frank Sever

*Attorney, Agent, or Firm*—Sughrue, Rothwell, Mion, Zinn and Macpeak

[57] ABSTRACT

A connection between tubes (26) in cyclone separators for separating liquid and vapour phases of a working fluid. It includes a pre-cut disc (21) in which are fitted the hexagonal ends (27) of stamped or cast metal adaptors, said adaptors being connected by their ends of the side opposite to the cross-sections of the tubes, thereby providing the inlet of the mixture in the tubes with a cross-section which is not very different from that of the supply tube.

5 Claims, 4 Drawing Figures

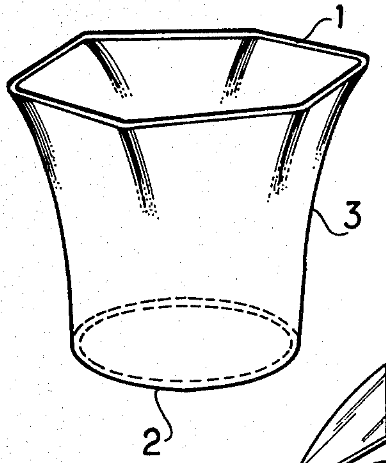
FIG.1
FIG.2
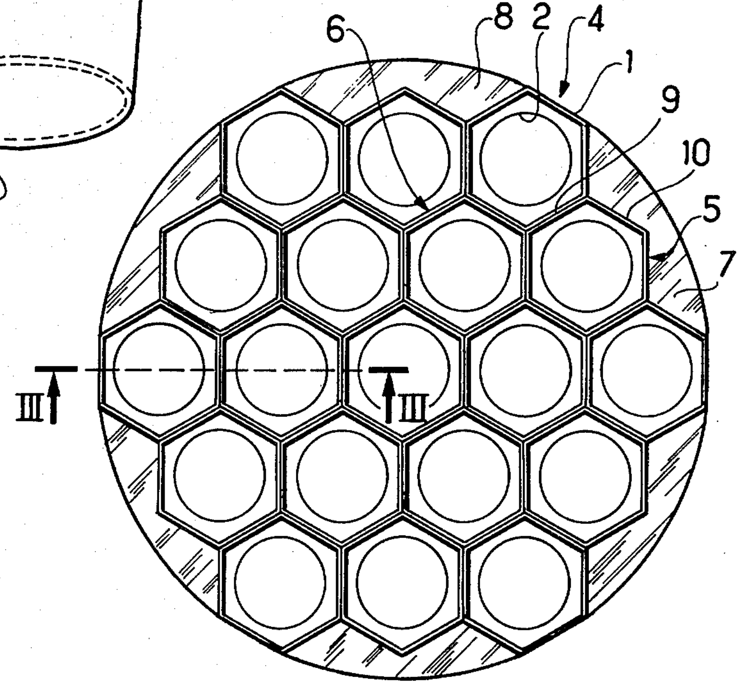
FIG.3
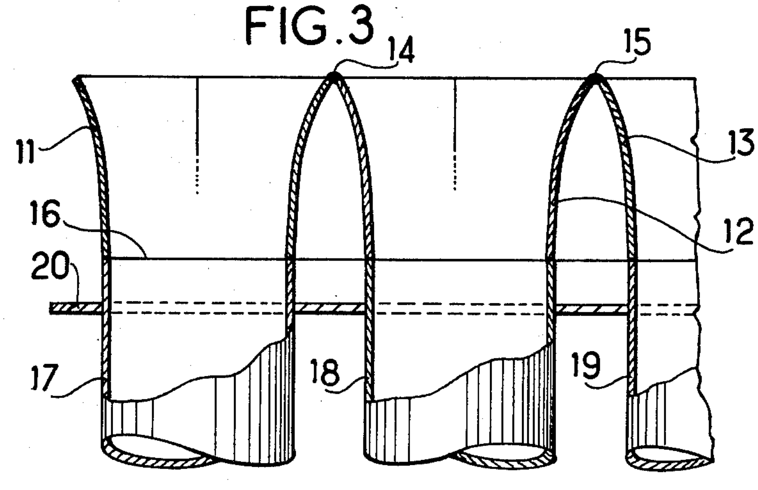

CONNECTION BETWEEN PARALLEL TUBULAR COMPONENTS OF A CYCLONE SEPARATOR

FIELD OF THE INVENTION

The present invention relates to a connection between the parallel tubular components of right circular section of a cyclone separator. The connection comprises a pre-cut inlet disc for the fluid to be separated, which disc is welded to polygonal inlet portions of the tubular components.

BACKGROUND OF THE INVENTION

Such a connection is described in French Pat. No. 11 88672 (corresponding British Pat. No. 877 257). However, these connections are relatively fragile in that the tubular separator components are only supported by weld lines between the components themselves and with the said disc. Further, the flow of fluid to be separated can cause tubes which are suspended in this manner to vibrate.

The aim of the present invention is to provide a connection which ensures a regular flow of the fluid to be separated at the inlets to the tubular separator components while remaining nearly as strong as the discs.

SUMMARY OF THE INVENTION

The present invention provides a connection, in a cyclone separator, between parallel tubular components of circular cross-section, the connection comprising a pre-cut inlet disc for fluid to be separated, polygonal adaptors for the tubular components being welded or brazed to the inlet disc, and another disc which forms a spacer for the tube portions which have a circular cross-section.

According to a first preferred variant of the invention, the pre-cut disc includes several sheet metal components which complete a circle which surrounds the set of polygonal openings of the tubular components, said openings being welded or brazed together along their adjacent sides, said set of polygonal openings being welded or brazed on its periphery to said sheet metal components.

According to another variant, the pre-cut disc is a circular disc with polygonal holes whose sides are parallel and close to one another.

According to a preferred variant, the tubular components are provided with stamped or cast adaptors whose cross-sections are circular where they are welded or brazed to said components and whose cross-sections are flared, polygonal and engage in the polygonal holes of the pre-cut disc and are welded or brazed thereto, thereby forming said openings.

According to another variant, the ends of the tubular components themselves are deformed on the sides nearest the pre-cut disc so that the cross-sections of their ends are polygonal and match the openings.

Preferentially, the openings of the tubular components are hexagonal.

A connection of the above type is suitable in particular for vertical separators of a mixture of steam and water as used in power stations including steam turbines. But it is suitable also for other types of separators, in particular horizontal separators, and for use with fluids other than steam and water.

Connections for parallel tubular components in accordance with the invention are described hereinbelow by way of an example and with reference to the figures of the accompanying drawings.

BRIEF DESCRIPTION OF THE DRAWINGS

FIG. 1 illustrates an adaptor designed to be fixed on the end of a tubular component;

FIG. 2 is a plan of a connection embodying the invention;

FIG. 3 is a cross-section on an elarged scale along the line III—III of FIG. 2.

DESCRIPTION OF PREFERRED EMBODIMENTS

Figure 4:
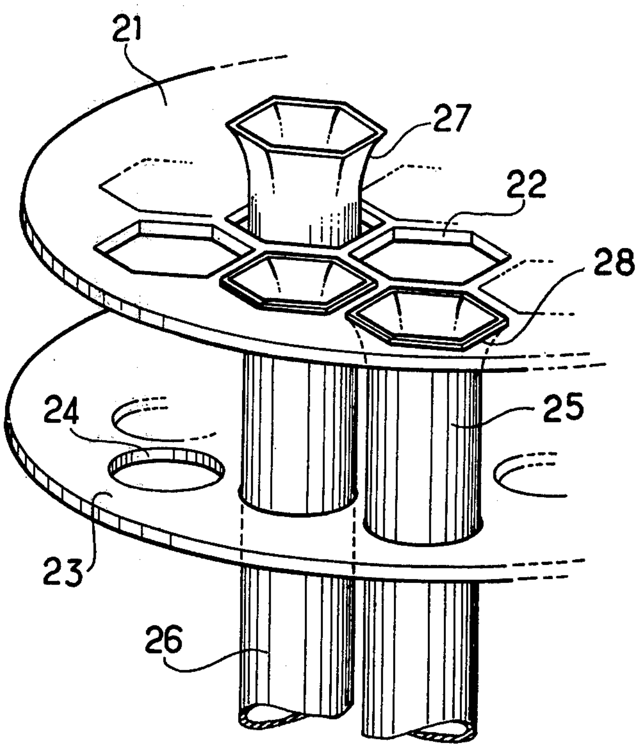
FIG. 4 is a perspective view of another connection device embodying the invention.

The adaptor of FIG. 1 includes a hexagonal upper end 1 and a circular lower end 2 connected together by a flared portion 3. It is formed by casting or by stamping a short length of circular tube.

The connection of FIG. 2 includes stamped or cast adaptors such as 4, 5 and 6. A pre-cut disc is composed of several plane sheet metal components such as 7 and 8. The upper ends 1 of the stamped adaptors are welded to each other along adjacent sides such as 9 and to the sheet steel components along other sides such as 10. The assembly formed by the welded hexagonal ends of stamped metal tube and by the sheet metal components reconstitutes a circular cross-section which corresponds substantially to the cross-section of the inlet passage for the mixture of liquid and vapour to be separated. It is seen that the mixture-passing cross-section provided through the separator components is only very slightly smaller then the total cross-section.

FIG. 3 shows the mode of assembling the stamped adaptors to the tubular components 17, 18, 19. The stamped adaptors 11, 12, 13 are welded together by weld beads 14 and 15, perpendicular to the plane of the figure and they are welded in the plane 16 to the ends of the tubular components 17, 18 and 19. These tubular components are held in position by a metal sheet 20 which forms a distance piece or spacer.

In the connection of FIG. 4, an upper plate 21 has hexagonal holes 22 with parallel sides which are close together. A lower disc 23 which forms a spacer has circular holes 24 for the tubular components 25, 26 and 27 to pass through. The components 25 and 26 are illustrated already in position, welded in the plate 21 by their hexagonal peripheries such as 28. The tubular component 27 is illustrated during its insertion into the disc 21 and 23.

Although the connections which have just been described with reference to the figures of the drawings seem to be preferential embodiments, it will be understood that various modifications can be made thereto without going beyond the scope of the invention, it being possible to replace some of their components by others which would perform an analogous technical function. In particular, the polygonal ends of the stamped or cast adaptors or of the tubular components can be connected by other means than welding, in particular by brazing. These ends can have regular polygonal shapes with more or less than 6 sides.

We claim:

1. A connection, in a cyclone separator, between parallel tubular components of circular cross-section, said connection comprising:

a pre-cut inlet disc for fluid to be separated, polygonal adaptors for said tubular components, said adaptors being welded to said inlet disc, and a second disc, coplanar with said first disc and having a predetermined spacing therefrom, and having spaced circular holes therein through which tubular component portions having a circular cross-section project, with said second disc forming a spacer for said tubular component circular cross-section said predetermined spacing being sufficient to substantially eliminate virbration of said tubular components during the operation of said cyclone separator.

2. A connection according to claim 1, wherein the pre-cut inlet disc includes several sheet metal components which when joined complete a circle which surrounds the set of polygonal openings of the tubular components, said sheet metal components being welded together along their adjacent sides, said tubular components polygonal openings being welded on their periphery to said sheet metal components.

3. A device according to claim 1, wherein the pre-cut disc is a circular disc with polygonal holes with sides which are respectively parallel and close to one another.

4. A device according to claim 1, wherein the tubular components are separate from said adaptors, and said adaptors have cross-sections which are circular on the end nearest said components and being flared at their other end at the level of said pre-cut disc, so as to form polygonal openings, said adaptors being welded at their ends having circular cross-sections onto abutting ends of said tubular components having a circular cross-section.

5. A device according to claim 1, wherein the ends of the tubes are deformed on the sides nearest the pre-cut disc so that the cross-sections of their ends are polygonal.

* * * * *